June 19, 1951  F. FUA ET AL  2,557,868
MEASURING AND TESTING METHOD AND APPARATUS
EMPLOYING X-RAYS
Filed March 12, 1948  4 Sheets-Sheet 1

INVENTORS
Frederic Fua
Robert C. Woods
BY
Bennie, Edmonds, Morton and Barrows
ATTORNEYS

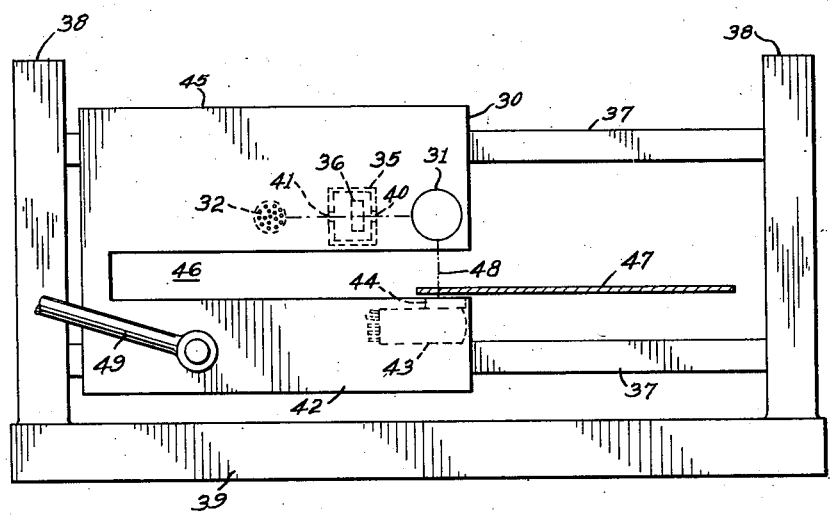
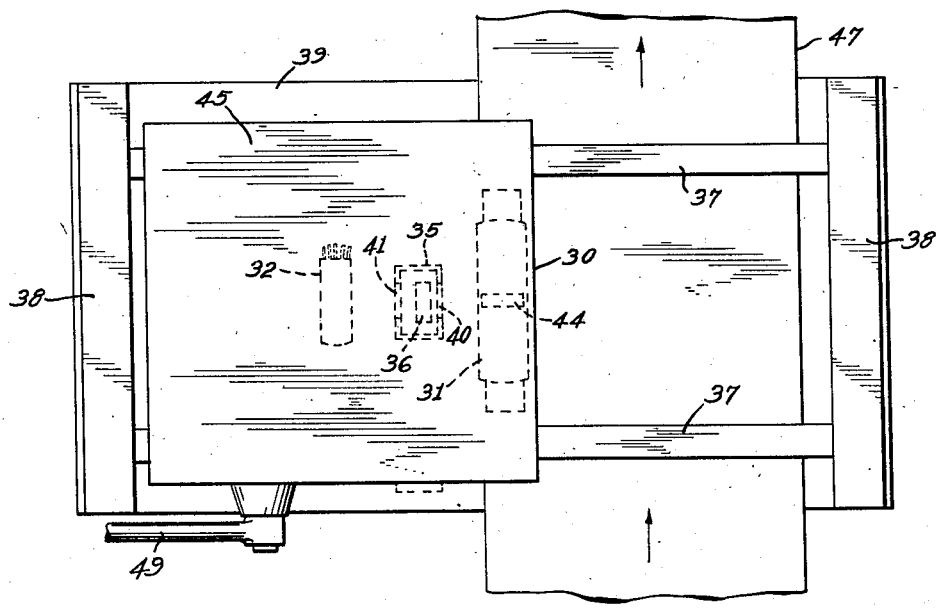

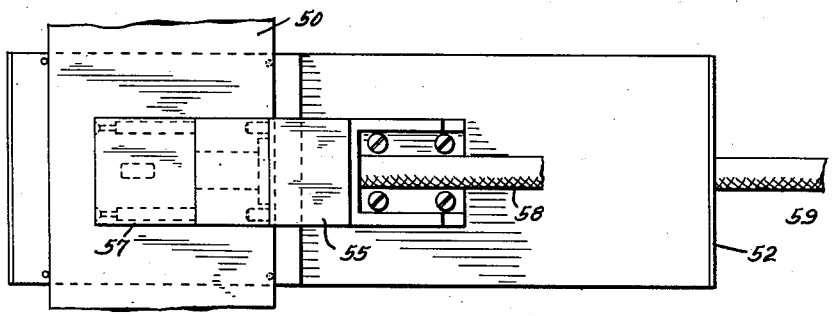
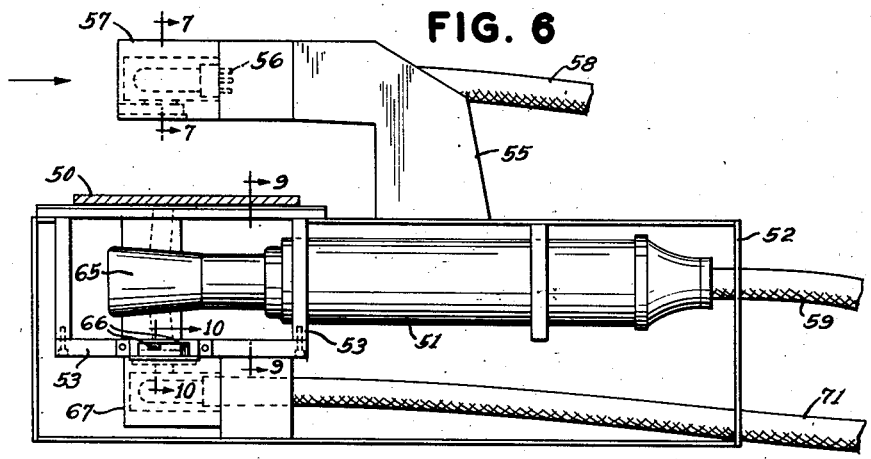
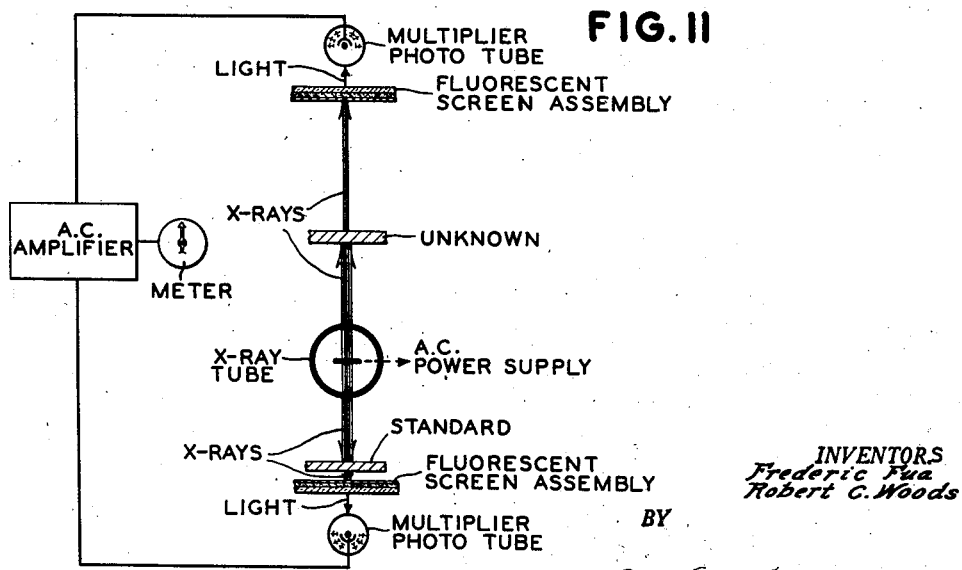

June 19, 1951  F. FUA ET AL  2,557,868
MEASURING AND TESTING METHOD AND APPARATUS
EMPLOYING X-RAYS
Filed March 12, 1948  4 Sheets-Sheet 4

INVENTORS
Frederic Fua
Robert C. Woods

BY
Pennie, Edmonds, Morton and Barrows
ATTORNEYS

Patented June 19, 1951

2,557,868

UNITED STATES PATENT OFFICE 2,557,868

MEASURING AND TESTING METHODS AND APPARATUS EMPLOYING X-RAYS

Frederic Fua, New York, N. Y., and Robert C. Woods, Montclair, N. J., assignors to X-Ray Electronic Corporation, New York, N. Y., a corporation of New York Application March 12, 1948, Serial No. 14,504

4 Claims. (Cl. 250—83.3)

This invention relates to measuring and testing apparatus, and more particularly to methods and apparatus for examination of materials by X-rays. This application is a continuation-in-part of Fua and Woods Application, Serial No. 558,928, filed October 16, 1944, now Patent 2,525,292.

A principal object of the invention relates to an X-ray testing device which is capable of ascertaining the internal physical condition of various articles.

Another object is to provide an improved X-ray method and apparatus for testing the thickness or other physical properties of a continuously moving fragile web, such as a metal foil, without a physical contact therewith.

A prime purpose of the invention is to provide an accurate and reliable non-contact thickness gage capable of measuring variations in thickness to a fraction of a per cent in the fast moving product, hot or cold, of a modern strip or rolling mill.

Another feature relates to an X-ray device for testing the thickness of materials such as metal foil webs, whereby greater sensitivity in testing thickness or density variations is attained.

A further feature relates to an X-ray testing device for testing variations in thickness or density across the width of a moving metal web, such for example as a continuously moving metal foil.

A still further feature relates to the novel organization, arrangement and relative location of parts which cooperate to produce a compact, safe and reliable X-ray testing device of the character to be described.

Other features and advantages not specifically enumerated will be apparent after a consideration of the following detailed description and the appended claims.

While the invention will be described in connection with the testing of metal foil and the like, it will be understood that in certain of its aspects, the invention is equally well applicable to the testing of a wide variety of articles. It is described in detail below with the aid of the accompanying drawings, in which:

Fig. 3 is an end view of a modification of Figs. 1 and 2;

Fig. 4 is a top-plan view of Fig. 3;

Fig. 5 is a plan view of a further modified form of the device illustrated in Fig. 1;

Fig. 6 is a side view of the device illustrated in Fig. 5;

Fig. 11 is a diagram schematically illustrating the functioning of the invention.

Figure 1:
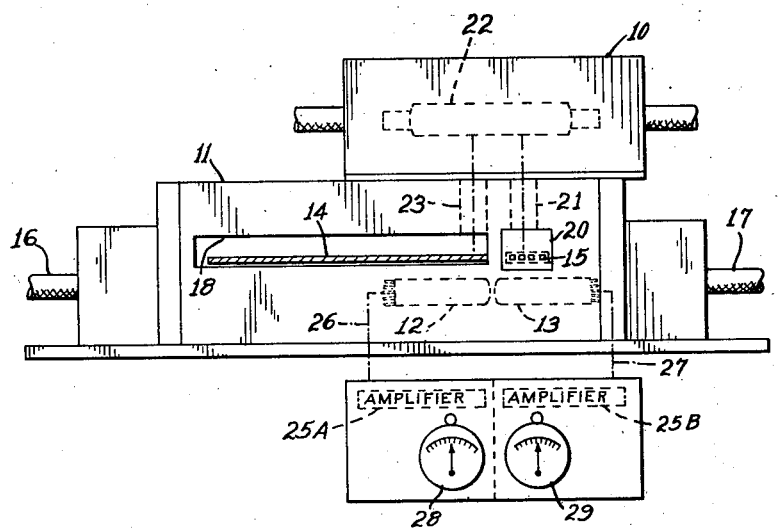
Fig. 1 is an end view of a device for testing the edge of metal webs.
Figure 2:
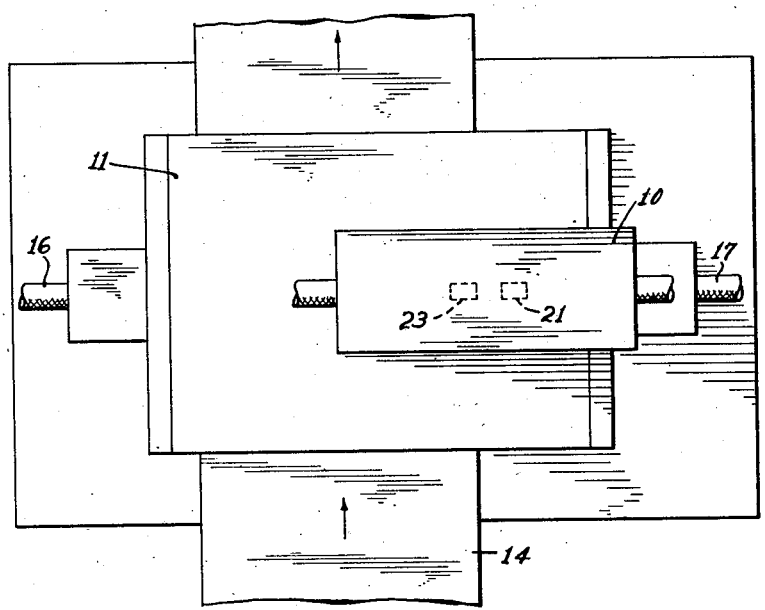
Fig. 2 is a top-plan view of Fig. 1.
Figure 7:
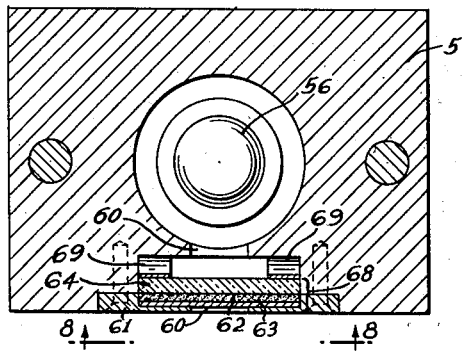
Fig. 7 is a section, on an enlarged scale, on the line 7—7 in Fig. 6.
Figure 8:
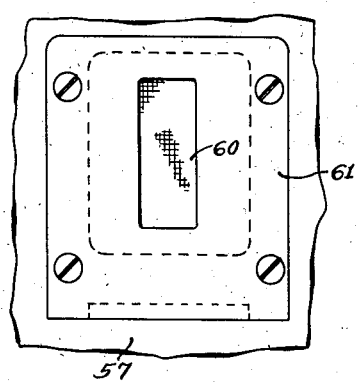
Fig. 8 is a partial bottom plan view of the testing cell housing aperture viewed in the direction of the arrows 8—8 in Fig. 7.
Figure 9:
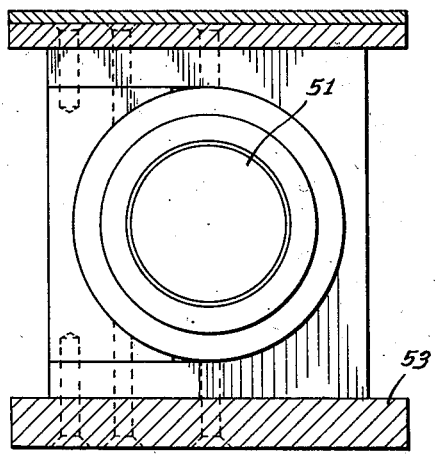
Fig. 9 is a section, on an enlarged scale, on the line 9—9 in Fig. 6.
Figure 10:
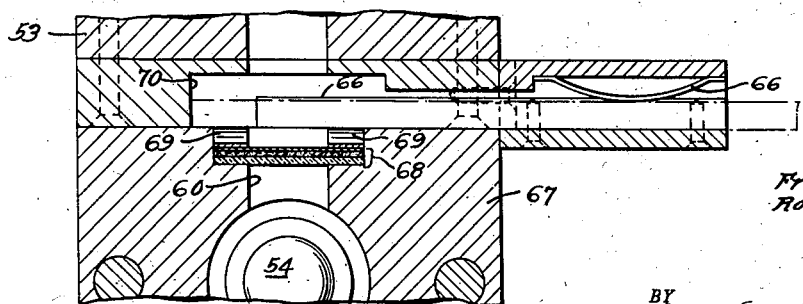
Fig. 10 is a section, on an enlarged scale, on the line 10—10 in Fig. 6.

Referring to Figs. 1 and 2, there is shown an arrangement for testing the thickness or density of continuously moving webs such as metal foil webs. The device comprises a metal housing 11 having a rectangular bore 18 extending entirely through its length and through which the metal web 14 to be tested is continuously fed. The housing 11 also has a cavity 20 in which is placed a standard sample 15 of the metal foil of known thickness and density. Communicating with the cavity 20 is a slit 21 through which the X-rays from the X-ray tube 22 pass. Likewise a slit 23 communicates with the bore 18 but adjacent one side only of the bore so that the X-rays impinge only on the longitudinal edge of the web 14.

Mounted in a suitable cavity beneath the bore 18 and beneath the cavity 15 are a pair of photoelectric cells 12, 13. These cells are mounted so that cell 12 responds only to the X-rays which pass through the edge of the web 14; while the cell 13 responds only to the X-rays which pass through the standard 15. The cells 12, 13, as shown by the multiplicity of leads reaching them, are preferably of the multiplier type. Each of the cells 12, 13 may be connected over conductors 26, 27 to a respective amplifier 25A and 25B, as illustrated in Fig. 1, to operate a corresponding meter or indicator 28, 29. Or the cells 12, 13 may be "bucked" and connected to a single amplifier and meter as illustrated in Fig. 11. This latter arrangement is especially desirable when the X-ray beam is given a regularly recurring component according to Fua, application Serial No. 561,361, filed November 1, 1944, now Patent 2,530,517. By confining the examination to the longitudinal edge of the web 14, greater sensitivity is obtained in the measurement of the web thickness or density. If the entire width of the web were subjected to the X-rays there would be an averaging effect over the entire width and local minor changes in thickness or density might give an improper indication of the actual thickness of the web.

Referring to Figs. 3 and 4, there is shown a device for measuring the density or thickness at any particular point or points across the width of the web while the latter is being fed continuously in the direction of its length. The device comprises a base 39 having a pair of parallel uprights 38 between which a pair of guide bars 37 extend. Adapted to slide along the bars 37 is a metal housing 30 containing on its interior an X-ray generator tube 31, a light-sensitive or photo-electric cell 32 and a receptacle 35 containing a standard sample 36 of known thickness and density. It will be understood of course that suitable slits 40, 41 are provided between the X-ray tube 31 and the photo-electric cell 32. The housing 30 also has a section 42 within which is enclosed another photo-electric cell 43 which is provided with a slit member 44 so that the X-rays from tube 31 also pass through said slit to the cell 43. The sections 42 and 45 of the housing 30 have a reentrant clear portion 46 and the metal foil or web 47 to be examined is supported on suitable guides (not shown) so as to be fed in a plane perpendicular to the X-ray beam 48. When it is desired to test only the edge section of the web 47, the entire unit 30 is held in the position shown in Fig. 3. If, however, it is desired to examine any particular section of the width of the web 47 while the latter is being fed in the direction of the arrows, the entire unit 30 is moved towards the right, under control of a suitable lever 49.

The effect of the foregoing arrangement is to provide, on the one hand, an electric current of undeviating peak or average magnitude proportional to the absolute density or thickness value of a comparison standard sample and of an appropriate order to be directly compared, on the other hand, with the peak or average value of the output of a photocell which has been activated proportionately to the intensity of an X-ray beam penetrating an unknown sample. In order to calibrate such apparatus for measuring by such comparison an unknown having any desired specification thickness or density, a sample of material having this specification characteristic is inserted in place of the unknown and the apparatus is then appreciately adjusted so that the photocell output and the comparison current of undeviating magnitude are strictly comparable, for example, when they are connected in voltage opposition, so that the resultant voltage is zero. It will, of course, be understood that the gauge actually measures effective X-ray opacity along a predetermined path so that, if a sample being measured is of the specification density, then any departure from standard must be due to a change in its thickness, while, on the other hand, if a sample is of specification thickness, then any departure from standard must be due to a change in its density. For example, the product of a rolling mill may be expected to remain of substantially uniform density, but to vary in thickness, while the product of an extrusion die may be expected to remain at substantially specification thickness, but to vary in density due to internal flaws.

In the modified form illustrated in Figs. 5–10, inclusive, the apparatus is arranged to measure the thickness of the relatively narrow, moving, sheet-metal strip 50 along its approximate center line. The X-ray tube 51 is positioned horizontally in cabinet 52 beneath web 50. Its X-ray windows are in the target end 65 enclosed in chamber 53 from which, through aperture plates, one beam of X-ray passes upward through web 50 into upper photocell chamber 57 and another beam passes downward through a comparison standard held in place by the springs 66 into lower photocell chamber 67. The tube 51 receives its power supply, preferably A. C., through the shielded cable 59. It will be observed that the cabinet 52 in which the X-ray tube 51 and lower photocell 54 are enclosed and upon which arm 55 carrying upper photocell 56, being of metal, affords ample electrostatic shielding for the parts it encloses. The X-ray windows of the tube 51 are nevertheless encased in heavy-walled chamber 53 for safety to restrict the outgoing X-ray to the apertures that guide the beams they form into the heavy-walled photocell chambers 57 and 67. The upper and lower photocells 56 and 54, of the multiplier type, are furnished with the necessary stepped-voltage power supply through the shielded cables 58 and 71, respectively. The thickness of the walls of chambers 57, 53 and 67 must be sufficient to prevent the escape of X-ray and to confine the beams to the desired paths. For this purpose, a variety of materials suffice, e. g., brass, and afford needed electrostatic shielding as well. As disclosed in our copending application, Serial No. 688,896, filed August 7, 1946, now Patent 2,512,247, the accuracy and precision of the instrument is materially enhanced by selecting the thickness and material of the box walls to make them effective anti-magnetic shielding as well.

The upper photocell chamber 57 has an aperture 60 for the admission of X-ray. This aperture is cut through the massive wall of the chamber 57 proper and through a plate 61 which also serves as a retainer plate for a fluorescent screen assembly 68 which is preferably constructed according to the disclosures of our copending applications, Serial Nos. 658,903, now abandoned, and 702,034, filed April 2, 1946 and October 8, 1946, respectively. The assembly 68 is held firmly in place by springs 69 and comprises an outer aluminum foil layer 63, a middle layer 62 of fluorescent material and an inner lead glass layer 64. The X-ray passing through aperture 60 penetrates foil layer 63, excites fluorescent layer 62 and is stopped by lead glass layer 64. The aluminum increases the response of the fluorescent material to the X-ray and also reflects this response, in the form of light. The fluorescent light passes through the glass to excite upper photocell 56 proportionately to the intensity of the X-ray entering aperture 60 while the glass protects the photocell from deterioration and erratic excitation that would result from direct exposure to the X-ray.

The lower photocell chamber 67 is essentially the same as upper chamber 57 having a similar aperture 60 covered by a fluorescent screen assembly 68 receiving X-ray from tube 51. There is, however, arranged in the path of the X-ray entering lower chamber 67 a comparison standard holder slide 70 in which the springs 66 are arranged to position the holder properly. The standard holder itself (not shown) is akin to a lantern slide holder, a frame of predetermined size and thickness conforming to the dimensions of slide 70 and interposing in the path of the X-ray reaching the screen 68 of lower chamber 67 only a piece of the metal web 50 being gaged known to be of true specification thickness. Lower photocell 54 is thus excited proportionately to the intensity of the X-ray penetrating the comparison standard. By suitable apparatus, the outputs of photocells 56 and 54 can be compared and a measure obtained of the thickness of the moving web 50.

One method of comparison, of course, is by visual comparison of separate output meters, as shown in Fig. 1, but an improved method of comparison is shown schematically in Fig. 11, applied to the apparatus illustrated in Figs. 5-10, inclusive. The X-ray tube has an A. C. power supply giving the X-ray emitted a pulsating characteristic. This pulsating X-ray penetrating the unknown above and the standard below is diminished by each proportionate to its individual absorption factor. Since the unknown and the sample are different only in thickness, if at all, the difference in diminution of the X-ray will be a measure of their difference in thickness. The diminished beams now strike the upper and lower fluorescent screen assemblies, the light from which strikes the upper and lower photocells respectively. Since the amount of light is absolutely very small, it is preferable to use photocells of the well-known multiplier type. The output of the upper and lower cells will be two pulsating electric currents each a measure in amount, respectively, of the thickness of unknown and standard. These currents are "bucked" and their algebraic sum amplified to activate a meter which will indicate the amount and sign of the amplified signal and hence the amount and sign of the difference in thickness of unknown and standard.

The life and service reliability of the apparatus disclosed, especially its accuracy in commercial use, is greatly increased by operating all the electrical and electronic elements thereof well below their rated capacities. For example, the multiplier photocells are rated for a stepped voltage power supply reaching the anodes reaching 1000–1100 volts, but in this service operate best with a stepped power supply reaching 600 volt maximum.

While certain particular embodiments have been disclosed herein, it will be understood that various changes and modifications may be made therein without departing from the spirit and scope of the invention. It will be understood that the X-rays are chosen as to hardness or penetrating power so that very little, if any, can escape through the metal walls of the various housings and castings.

In the appended claims the expression "cross-sectional mass" is used to define the quantity of X-ray absorbing material in the path of the X-ray beam. This is synonymous with geometrical thickness in a rolled metal sheet. It is also equivalent to the quantity of coating material per unit of area of a coated fabric.

The expression "extended length of material" is intended to include sheets, webs, rods, pipes and the like wherein uniformity of cross-sectional mass throughout a substantial area is desired.

We claim:
1. The method of measuring the cross-sectional mass at different locations in an extended length of material which comprises directing, in one operation, a beam from a source of X-ray through a defined area of material of desired cross-sectional mass, intercepting said X-ray on a screen of fluorescent material having a light output proportional to X-radiation intercepted by it, directing the light generated by said screen upon a photo-cell having an output proportional to light directed upon it, measuring the output of said cell, directing, in a second operation, a substantially identical beam of X-ray through a like area of the extended length of material to be measured, intercepting said last-mentioned beam of X-ray on a screen of fluorescent material having a light output proportional to X-radiation intercepted by it, directing the light generated by said last-mentioned screen upon a photo-cell having an output proportional to light directed upon it, and measuring the output of the photo-cell in said second operation for comparison with the output of the photo-cell in said first operation.

2. The method recited in claim 1 including the step of continuously moving said extended length of material across the path of the X-ray beam.

3. The method recited in claim 1 in which the X-ray directed through the defined area of material of desired cross-sectional mass and the X-ray directed through the like area of the extended length of material to be measured are simultaneously supplied from a single source of X-ray.

4. The method recited in claim 3 including the step of continuously moving said extended length of material across the path of the X-ray beam.

FREDERIC FUA.
ROBERT C. WOODS.

REFERENCES CITED

The following references are of record in the file of this patent:

UNITED STATES PATENTS

| Number | Name | Date |
|---|---|---|
| 2,094,318 | Failla | Sept. 28, 1937 |
| 2,097,760 | Failla | Nov. 2, 1937 |
| 2,189,623 | Bourland | Feb. 6, 1940 |
| 2,222,450 | Trost | Nov. 19, 1940 |
| 2,264,725 | Shoupp et al. | Dec. 2, 1941 |
| 2,301,251 | Capen | Nov. 10, 1942 |
| 2,349,429 | Herzog | May 23, 1944 |
| 2,370,163 | Hare | Feb. 27, 1945 |
| 2,401,288 | Morgan et al. | May 26, 1946 |

FOREIGN PATENTS

| Number | Country | Date |
|---|---|---|
| 482,354 | Great Britain | June 19, 1936 |

OTHER REFERENCES

Allen—Review of Scientific Instruments—vol. 12, October 1941, pp. 484–488.

Smith—General Elec. Review—March 1, 1945, pp. 13–17.